L. C. BRISTOL.
Improvement in Plow-Wheel.

No. 127,734.   Patented June 11, 1872.

Witnesses.  
Thos Curtis  
C A Curtis

Inventor.  
Levi C. Bristol 127,734

UNITED STATES PATENT OFFICE.

LEVI C. BRISTOL, OF HOLLY, MICHIGAN.

IMPROVEMENT IN PLOW-WHEELS.

Specification forming part of Letters Patent No. 127,734, dated June 11, 1872.

SPECIFICATION.

I, LEVI C. BRISTOL, of Holly, Oakland county, Michigan, have invented certain Improvements in Plow-Wheels, in such a manner as to prevent the sand and dust from working into the working parts.

Figure 1:
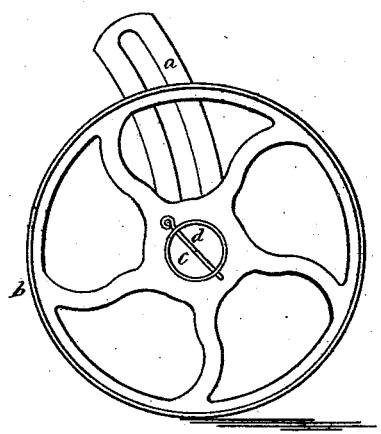
Figure 2:
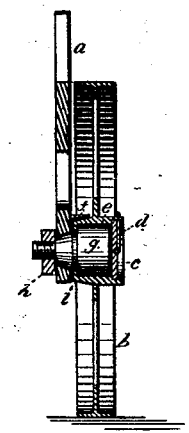
Figure 3:

Figure 1 is an external side view of all the parts put together, showing the dust cap and pin in place. $a$ is the standard. $b$ is the wheel. $c$ is the dust-cap. $d$ is the pin which holds the dust-cap in place. Fig. 2 is a sectional view of all the working parts in place. $e$ is the wheel hub. $g$ is the axle. $h$ is the nut on the back side of the standard, which holds the axle in place. $i$ is the shoulder in the axle, and the corresponding shoulder in the mortise in the hub. Fig. 3 is a view of the dust-cap.

In my improvement the standard and axle are in separate parts instead of being cast whole as heretofore; and consists of the combination of a wheel, a standard, an axle, and a dust-cap.

The standard is similar to those now in use, except it has no axle at the lower end for the wheel to run on, but instead of the axle it has an orifice to receive it. The small end of the axle is passed through the standard, and fastened by a nut and screw on the back side, as in Fig. 2. The axle on which the wheel runs is made separate from the other parts, and is largest at the outer end with a screw-thread on the small end to receive a nut on the back side of the standard to hold it fast to the standard. Near the small end of the axle is a square shoulder which fits to a corresponding shoulder on the inside of the mortise in the wheel-hub to exclude the dust, and to hold the wheel in place. This arm or axle is passed through the hub of the wheel first, small end foremost, then through the hole in the standard and fastened by a nut on the back side of the standard, as shown in Fig. 2, instead of having the nut on the outside of the wheel-hub, as heretofore in use, thus reversing the shape of the axle, and also the mortise, through the wheel-hub making the external end of the axle, and of the mortise in the hub, larger than the internal, as shown in Fig. 2. The wheel is similar, both in size and shape, to those now in general use, except the mortise through the hub is larger on the external than the internal side, and has a square shoulder near the internal side to fit the shoulder in the axle, and to exclude the dust from the working parts, as shown in Fig. 2. It also has a band on the external end of the hub, extending out beyond the end of the axle to receive the dust-cap to exclude the dust from the working parts, with pin-holes through it to receive a pin to hold the dust-cap in place, all of which is shown in Fig. 2. The axle has nearly a true taper from the external to near the internal end, where there is a square shoulder. From the shoulder it tapers faster, and forms the neck which passes into the standard with a screw on the end which receives the nut on the internal side of the standard to hold the several parts firmly together, and the mortise through the wheel-hub is similarly formed so as to fit the axle, all of which is shown in Fig. 2. The dust-cap is a thin piece of metal fitted in the external end of the mortise in the wheel-hub, and fastened by a pin to exclude the dust, as shown in Figs. 1 and 2.

I claim as my invention—

The combination and arrangement of the standard $a$, the wheel $b$, the axle $g$, the dust-cap $c$, the pin $d$, and the nut and screw $h$, substantially as and for the purposes hereinbefore set forth.

LEVI C. BRISTOL.

Witnesses:
   THOS. CURTIS,
   C. A. CURTIS.